United States Patent Office 2,808,331
Patented Oct. 1, 1957

2,808,331

PHOTOGRAPHIC EMULSIONS CONTAINING SYNTHETIC POLYMER VEHICLES

Cornelius C. Unruh, Donald A. Smith, and William J. Priest, Rochester, N. Y., assignors to Eastman Kodak Company, Rochester, N. Y., a corporation of New Jersey No Drawing. Application June 29, 1955,
Serial No. 518,967

4 Claims. (Cl. 96—114)

This invention relates to photographic silver halide emulsions and in particular to hydrophilic colloid vehicles for such emulsions.

It is well known in photography to employ gelatin as a vehicle or carrier for the light-sensitive silver halides. In recent years, in order to improve the photographic properties of silver halide emulsions, attempts have been made with varied success to prepare photographic emulsions in which the gelatin has been replaced in whole or in part by other hydrophilic organic colloids such as hydrophilic synthetic polymers. Among such polymers is polyvinyl alcohol. Polyvinyl alcohol has many desirable properties, but one of the chief disadvantages of its use is that of the lack of a really good procedure whereby the coated polymer may be hardened at will to the precise degree where water-solubility is lost but permeability to salt solutions is retained along with the desirable physical and mechanical properties of polyvinyl alcohol films. These mechanical and physical properties of polyvinyl alcohol are to a large extent due to the regular spacing of hydroxyl groups along the polymer chain. In order to appreciably affect the water-solubility of the polymer it becomes necessary to react a considerable proportion of these hydroxyl groups in the preparation of various water-insoluble derivatives. Alternatively, appendage of other groups to the polymer chain (other than at the site of the hydroxyl groups) to achieve water-insolubility is likewise generally unsatisfactory, for too many of such appendages are required to attain this water-insolubility and these interfere seriously with the interaction between hydroxyl groups of adjacent chain molecules.

We have discovered that very small amounts of certain groups may be appended to the polyvinyl alcohol molecule to obtain polymers which are still water-soluble yet the polymers are capable of being hardened at some stage in their use in photographic elements.

The polymers used in the photographic emulsions of the invention are obtained by appending very small amounts of vinyl-cyanoacetate or allyl-cyanoacetamides to the vinyl alcohol polymer molecule.

The polymers of the invention may be characterized as film-forming copolymers of vinyl alcohol containing from about 0.4 to 2.5 mole percent of one of the following recurring units:

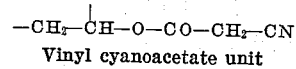

Vinyl cyanoacetate unit

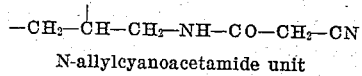

N-allylcyanoacetamide unit

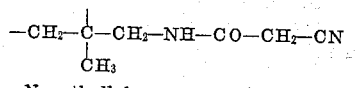

N-methallylcyanoacetamide unit

The remaining recurring units of the polymers (99.6 to 97.5 mole percent) are substantially all vinyl alcohol units with the exception that small amounts of the order of 1–2 mole percent of the recurring units may be vinyl ester units which have not been hydrolyzed in making the polyvinyl alcohol used or not hydrolyzed when the vinyl ester-allylcyanoacetamide copolymers are hydrolyzed as described in the examples hereinafter.

EXAMPLE 1

*Vinyl alcohol-vinyl cyanoacetate copolymer*

To a stirred solution of 5 ml. of 85% phosphoric acid and 100 g. of cyanoacetic acid in 500 ml. of 1,4-dioxane was added 44 g. of polyvinyl alcohol. After stirring for 15–20 minutes, the suspension was heated and stirred on the steam bath for 5 hours. The mixture was filtered and then well washed with methanol and dried. The yield was 46 g. Analysis indicated that the product contained about 2 mole percent of vinyl cyanoacetate. A coating made from this polymer when treated with an aqueous solution of formaldehyde became insoluble in hot and cold water, the original polymer being soluble in water. This polymer can be used as a photographic emulsion vehicle by preparing a coagulum of silver halide in the manner of the following examples and then adding this coagulum to an aqueous solution of the vinyl alcohol-vinyl-cyanoacetate copolymer. An emulsion thus prepared may be coated on a support such as paper or cellulose ester film and after exposure to a subject can be developed with a silver halide developing solution containing formaldehyde as a hardening agent or formaldehyde may be employed in a separate rinse bath following development to harden the developed emulsion layer. From this procedure it is apparent that the vinyl alcohol copolymer has the unusual property of being readily hardened by formaldehyde and other aldehydes. Alkali alone has a pronounced hardening effect upon the polymer.

EXAMPLE 2

*Vinyl alcohol-vinyl cyanoacetate copolymer*

Ten grams of a partial chloroacetic acid ester of polyvinyl alcohol (Cl content=11.1%) was dissolved in a mixture of 75 ml. of methanol and 30 ml. water. Five grams of potassium cyanide was added and the mixture was warmed on the steam bath. A smooth brown solution formed which was poured into a large volume of methanol. The fibrous precipitate was thoroughly extracted with methanol in a Soxhlet extraction. The extracted polymer was leached in two changes of ether and dried at 40° F. The yield of product was 6.5 g., whose chlorine content was now less than 1% and contained 1.2% of nitrogen representing 9.5 weight percent of vinyl cyanoacetate.

This polymer is also soluble in water and has properties similar to that made by the procedure of Example 1 in that the polymer can be readily insolubilized with alkali or formaldehyde. Silver halide emulsions containing the polymer as the vehicle can be handled as described in Example 1 using formaldehyde in the processing solutions.

EXAMPLE 3

*N-allylcyanoacetamide*

A mixture of 113 g. of ethyl cyanoacetate and 150 g. of allylamine was kept at room temperature for two hours after the first vigorous reaction had subsided. Distillation of the mixture yielded a fraction boiling at 123–130° C. and 0.6 to 1.0 mm. This was recrystallized from benzene and melted at 63–65° C.

Calculated for $C_6H_8N_2O$: C=58.0; H=6.45; N=22.6.
Found: C=58.2; H=6.5; N=23.0.

Vinyl alcohol-N-allylcyanoacetamide copolymers

Vinyl alcohol-N-allylcyanoacetamide copolymers containing varying amounts of N-allylcyanoacetamide can be prepared by varying the amount of N-allylcyanoacetamide polymerized with vinyl acetate or other vinyl ester such as vinyl propionate or vinyl butyrate followed by alcoholic acid hydrolysis of the vinyl ester portion of the copolymer. It is desirable to incorporate not less than about 0.4 mole percent of N-allylcyanoacetamide into the polymer molecule, otherwise the polymer will not harden well with alkali or formaldehyde. Similarly, if an attempt is made to incorporate more than about 2.5 mole percent of N-allylcyanoacetamide into the polymer molecule, the molecular weight of the resultant polymer is undesirably low. Varying amounts of N-allylcyanoacetamide may be incorporated into the polymers as follows:

EXAMPLE 4

A solution consisting of 430 g. vinyl acetate, 7.0 g. of N-allylcyanoacetamide, 1.0 g. potassium persulfate, 1.25 g. benzoyl peroxide and 158 g. methanol was heated under reflux at 65° C. for two days. The viscous mass was diluted with 880 ml. of methanol and the resulting solution was heated to boiling and stirred, excess monomeric vinyl acetate being distilled off. The volume of polymer solution was kept constant by addition of methanol. When the odor of vinyl acetate was no longer evident in the distillate, the solution was cooled and a mixture of 75 ml. of concentrated hydrochloric acid and 250 ml. of methanol added thereto. This was allowed to stand at 50° C. for 16 hours and the resulting clear gel was cut up in small pieces and washed acid free with a number of changes of 50% aqueous methanol. A portion of this product was dried down and found to contain 0.47% of nitrogen (as determined by the Kjeldahl method) representing 0.74 mole percent of the N-allylcyanoacetamide units in the polymer. The inherent viscosity in water (2.5 g./liter) was 0.66.

EXAMPLE 5

The procedure described above was repeated except that 4.0 g. of N-allylcyanoacetamide was used instead of 7.0 g. The product had a nitrogen (Kjeldahl) content of 0.24 representing a mole percentage substitution of 0.38. Its inherent viscosity in water (2.5 g./liter) was 0.65.

EXAMPLE 6

The procedure described under Example 4 was repeated except that 12.5 g. of N-allylcyanoacetamide was used instead of 7.0 g. The product had a nitrogen value (Kjeldahl) of 0.8%, representing a 1.3 molar percent content of N-allylcyanoacetamide. The inherent viscosity in water (2.5 g./liter) was 0.52.

EXAMPLE 7

The procedure described under Example 4 was repeated except that 10.0 g. of N-allylcyanoacetamide was used instead of 7.0 g. The product had a nitrogen value of 0.74% representing 1.2 molar percent substitution of N-allylcyanoacetamide.

EXAMPLE 8

A solution consisting of 86 g. vinyl acetate, 3.0 g. N-allylcyanoacetamide, 0.20 g. benzoyl peroxide was heated in a 60° C. bath for 3 days. The resulting product was diluted with methanol and heated to boiling, excess monomeric vinyl acetate being removed in the distillation. The residual methanolic solution was treated with 15 ml. of concentrated hydrochloric acid at 50° C. overnight. The clear gel formed was dissolved in a little water and precipitated into a large volume of a 50:50 mixture of ether and isopropyl alcohol. It was washed in such a solvent mixture until free from acid, then dried. The nitrogen content indicated a content of 1.6 mole percent of N-allylcyanoacetamide in the copolymer.

EXAMPLE 9

N-methallylcyanoacetamide

A mixture of 80 g. of methallylamine and 113 g. of ethylcyanoacetate was heated for 1½ hours on the steam bath, then submitted to a vacuum distillation. The fraction boiling at 140–160° and 3–5 mm. was collected and redistilled twice. The final distillation yielded 58 g. of a pale yellow solid, boiling at 116–117° at 0.3 mm.

Calcd. for $C_7H_{10}N_2O$: C, 60.9; H, 7.25; N, 20.3. Found: C, 59.7; H, 7.3; N, 20.2.

EXAMPLE 10

Vinyl alcohol-N-methallylcyanoacetamide copolymer

A solution of 86 g. vinyl acetate, 2.0 g. N-methallylcyanoacetamide and 0.20 g. benzoyl peroxide was heated at 65° for three days. The resulting pale yellow mass was dissolved in 220 ml. of methanol and the excess monomeric vinyl acetate removed by heating the solution at its boiling point until the odor of vinyl acetate was gone. To the solution was added 15 ml. of concentrated hydrochloric acid and kept at 50° C. overnight. The gel which formed was dissolved in water and the polymer precipitated by pouring the solution slowly into a large volume of agitated 50:50 isopropanol-ether mixture. The polymer was washed in fresh batches of this solvent combination until the polymer was acid free. The dried product contained about 1 mole percent of combined N-methallylcyanoacetamide.

The polymers of Examples 4 to 8 are soluble in water and the addition of a small amount of caustic alkali solution to ether-aqueous solutions causes them to become insoluble. Addition of alcoholic alkali solution to alcoholic solutions of the vinyl acetate-N-allylcyanoacetamide copolymers of these examples causes formation of an insoluble gel in a very short time.

The unusual properties of the vinyl alcohol-N-allylcyanoacetamide copolymers prepared as described immediately above, that is, the ability to be insolubilized with alkali or an aldehyde such as formaldehyde, can be taken advantage of in preparing and using silver halide emulsions containing these polymers. If desired, silver halide emulsions containing the polymers can be coated on an alkaline support with the result that the emulsion will readily harden during the drying operation. Otherwise the emulsion can be coated on a support such as paper containing formaldehyde or a formaldehyde derivative such as trioxymethylene or sodium formaldehyde bisulfite with the result that the emulsion will harden on drying. Likewise, photographic elements carrying silver halide emulsions containing these polymers can be processed in alkaline solutions containing formaldehyde if desired to further harden the emulsions.

Photographic silver halide emulsions can be prepared using the above vinyl alcohol copolymers as vehicles by simply dispersing the polymers in water and precipitating silver halide in the solution preferably using a silver halide peptizing agent to obtain the desired photographic properties. The following example illustrates a satisfactory procedure for utilizing the vinyl alcohol-N-allylcyanoacetamide copolymers as the emulsion vehicles:

EXAMPLE 11

An emulsion similar to those published by Trivelli and Smith, Photo. J. 79, 1939, 80, 1940, was prepared in the following manner: In 750 ml. of distilled water heated to 40° C. were dissolved 12.5 grams of phthalyl gelatin, as disclosed in U. S. Patent No. 2,614,928, 70 grams potassium bromide and 0.7 gram potassium iodide. The pH was adjusted to 6.0 and the temperature was elevated to 60° C.

Into this solution, a solution of 85 grams AgNO₃ dissolved in 800 ml. of distilled water at 50° C. was introduced with mechanical agitation for a period of 6 minutes. After cooling to 30° C., the pH was adjusted to 3.2 with 2.5 N sulfuric acid and a coagulum immediately formed. After chilling and settling for 5 minutes, the mother liquor was poured off and the coagulum was redispersed in 1500 ml. of distilled water at 40° C. and pH=4.0. The mother liquor was decanted after chilling and settling for 5 minutes and the coagulum was dispersed in distilled water at 40° C. to a total volume of 600 ml. The pH was adjusted to 6.0 and 2.0 mg. of acetyl thiourea were added.

Into 100 cc. of an 8% aqueous solution of the polymer of Example 7 were dispersed 33 cc. of the dispersed emulsion coagulum prepared immediately above. The resulting emulsion was then coated upon film support and dried. If desired, 16 milligrams of boric acid may be added to the emulsion before coating and setting of the emulsion can be facilitated by fuming it with ammonia following coating.

When the coating was exposed on an Eastman Kodak Type IB Sensitometer and developed 3 minutes in Eastman Kodak D–19 developer the following sensitometric values were obtained—30/E speed 16.1, gamma 0.80, fog 0.04. A check emulsion made in the manner of this example except using gelatin throughout had speed, gamma and fog values of 21.5, 1.24 and 0.04, respectively, when tested in the same manner.

A procedure for hardening emulsions containing the polymer vehicles of the invention is to incorporate the hardening agent mentioned, in the developer compositions used for development of the emulsions. For example, 1% by weight of β-methylglutaraldehyde in the following developer formula hardens the emulsions satisfactorily:

| | Grams |
|---|---|
| Monomethyl-p-aminophenol sulfate | 1.0 |
| Sodium sulfite (des.) | 75.0 |
| Hydroquinone | 9.0 |
| Sodium carbonate (des.) | 25.0 |
| Potassium bromide | 5.0 |
| Water to 1 liter. | | pH adjusted to 10.5 with sodium carbonate solution.

Another hardening developer formula is as follows:

| | Grams |
|---|---|
| Hydroquinone | 9 |
| 5-methyl-1,2,3-benzotriazole | 0.1 |
| Bisulfite complex of β-methyl glutaraldehyde | 15 |
| 1-p-β-hydroxyethylphenyl-3-pyrazolidone | 1 |
| Sodium sulfite (anhydrous) | 70 |
| Sodium carbonate monohydrate | 30 |
| Potassium bromide | 5 |
| Sufficient water to make 1 liter. | |

In the above, the benzotriazole was added as a 1% solution in isopropyl alcohol.

What we claim is:

1. A photographic emulsion comprising a mixture of silver halide and a hydrophilic film-forming polymer containing from about 0.4 to 2.5 mole percent of recurring units of the class consisting of

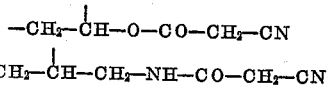

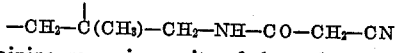

and

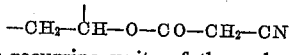

the remaining recurring units of the polymer being substantially all vinyl alcohol units.

2. A photographic emulsion comprising a mixture of silver halide and a hydrophilic film-forming polymer containing from about 0.4 to 2.5 mole percent of recurring units having the structure

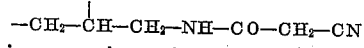

the remaining recurring units of the polymer being substantially all vinyl alcohol units.

3. A photographic emulsion comprising a mixture of silver halide and a hydrophilic film-forming polymer containing from about 0.4 to 2.5 mole percent of recurring units having the structure

—CH$_2$—CH—CH$_2$—NH—CO—CH$_2$—CN the remaining recurring units of the polymer being substantially all vinyl alcohol units.

4. A photographic emulsion comprising a mixture of silver halide and a hydrophilic film-forming polymer containing from about 0.4 to 2.5 mole percent of recurring units having the structure

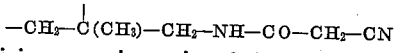

the remaining recurring units of the polymer being substantially all vinyl alcohol units.

References Cited in the file of this patent

UNITED STATES PATENTS

| 2,484,456 | Lowe et al. | Oct. 11, 1949 |
| 2,566,255 | Smith et al. | Aug. 28, 1951 |
| 2,596,650 | Caldwell | May 13, 1952 |
| 2,632,704 | Lowe et al. | Mar. 24, 1953 |